United States Patent
Sato

Patent Number: 6,067,418
Date of Patent: May 23, 2000

[54] CAMERA WITH A SHAKE DETECTION FUNCTION

[75] Inventor: Tatsuya Sato, Hachioji, Japan

[73] Assignee: Olympus Optical Co., Ltd., Tokyo, Japan

[21] Appl. No.: 09/160,005

[22] Filed: Sep. 24, 1998

[30] Foreign Application Priority Data

Sep. 24, 1997 [JP] Japan ................................. 9-258606

[51] Int. Cl.[7] .................................................. G03B 17/00
[52] U.S. Cl. ............................................................. 396/52
[58] Field of Search ................................ 396/52, 53, 55; 348/208; 359/554

[56] References Cited

U.S. PATENT DOCUMENTS

| | | | |
|---|---|---|---|
| 5,530,505 | 6/1996 | Ohishi et al. | 396/52 |
| 5,534,967 | 7/1996 | Matsuzawa | 396/55 |
| 5,835,796 | 11/1998 | Miyamoto et al. | 396/55 |

FOREIGN PATENT DOCUMENTS 08082820  3/1996  Japan .

*Primary Examiner*—W. B. Perkey
*Attorney, Agent, or Firm*—Louis Weinstein

[57] ABSTRACT

A camera with a shake detection function includes a shake detector for detecting a camera shake, a signal amplifier which performs a differential amplification based on an output of the shake detector and a voltage value output by a camera controller, while level-shifting its own amplified voltage, and a camera controller for controlling a shake detection in response to the output of the signal amplifier, and also for controlling an autofocus operation and a film advancing operation. The camera controller is provided with the functions of sampling the output voltage of the signal amplifier, comparing the sampled shake value with a predetermined value, and generating a predetermined analog voltage to be fed to the signal amplifier. The invention provides a camera with a simple, compact and high-accuracy shake detector without the need for a dedicated module.

21 Claims, 7 Drawing Sheets

6,067,418

CAMERA WITH A SHAKE DETECTION FUNCTION

BACKGROUND OF THE INVENTION

1. Field of the Invention

The present invention relates to a camera with a shake detection function.

2. Related Art Statement

As disclosed in Japanese Unexamined Patent Publication No. 8-82820, conventional cameras having a shake detection function comprising a dedicated module, containing a differential amplifier, an interface IC, and the like, between a shake sensor and a CPU for controlling the camera, wherein the module amplifies the output of the shake sensor, such as a vibratory gyroscope for detecting a shake of the camera. The CPU issues a state setting signal to the module to keep an output signal of the module to within an appropriate range, specifically, to keep amplified shake information signal from saturation. In response to the state setting signal, the module feeds an appropriate analog voltage to the differential amplifier to keep the output signal to within the appropriate range.

In this way, an offset in the output of the shake sensor is apparently canceled, and the detailed shaken state of the camera is observed over a wide range.

Since the device, disclosed in Japanese Unexamined Patent Publication No. 8-82820, requires a plurality of control lines for controlling the module between the dedicated module and the CPU, the hardware structure of the device becomes complicated. The use of the plurality of control lines makes a circuit board bulky, leading to a bulky device.

Each time the state of the module is determined to control the device accordingly, signals are transmitted. Signal transmission takes time. If the signal transmission is too slow, the detection accuracy of the camera shake is degraded. The use of a fast CPU in an attempt to resolve such a problem may increase not only the power consumption but also the cost of the device.

To monitor the state of the module and then to control the module according to the state monitored, a plurality of pieces of information about the module need to be stored in CPU, requiring a larger memory capacity in CPU. A CPU with a large memory capacity is costly. Since the above-described dedicated module is special and not commercially available, it is expensive.

SUMMARY OF THE INVENTION

Accordingly, it is an object of the present invention to provide a compact, simple-construction and high-accuracy camera having a shake detection function without the need for a dedicated module.

To achieve the above object, the camera with a shake detection function of the present invention comprises a shake detector for detecting the shake of a camera, a signal amplifier for amplifying the output of the shake detector, and a controller for controlling the operation of the camera, wherein the controller samples the output of the signal amplifier while outputting a predetermined voltage to the signal amplifier to keep the output state of the signal amplifier to within an appropriate range according to the sample result.

These and other features and advantages of the present invention will become apparent from the following description of its preferred embodiment.

DESCRIPTION OF THE PREFERRED EMBODIMENTS

Figure 1:
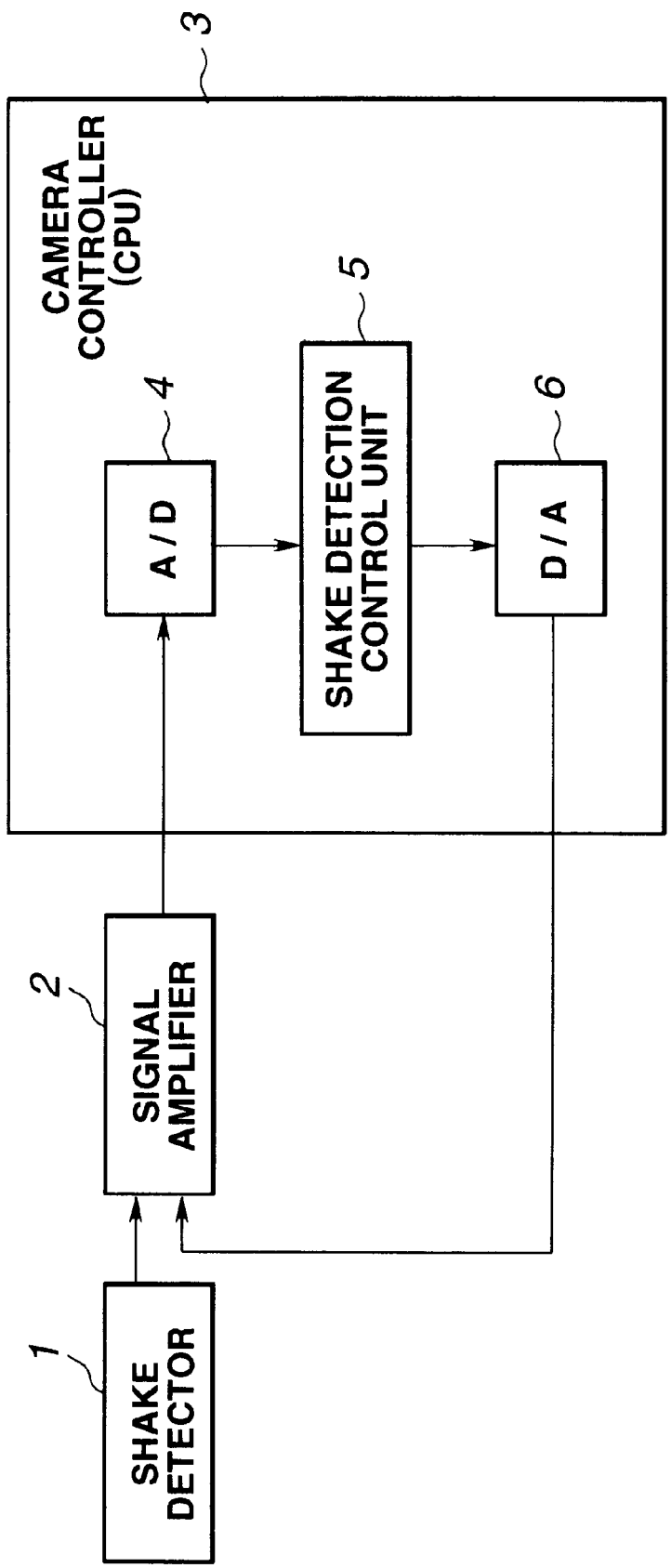
FIG. 1 shows a major portion of a camera with a shake detection function according to one embodiment of the present invention.

Referring to the drawings, one embodiment of the present invention is now discussed. FIG. 1 shows a major portion of a camera with a shake detection function, of the embodiment of the present invention.

The device shown in FIG. 1 comprises a shake detector 1 (shake detector means) for detecting a shake of the camera, a signal amplifier 2 (signal amplifier means) which amplifies the output of shake detector 1 based on a voltage value output by a camera controller to be described later, while shifting its own output voltage level, and the camera controller 3 for controlling the shake detection and the general operation of the camera in response to the output of the signal amplifier 2.

Employed as the shake detector 1 are a pair of units of known angular velocity type sensors such as a vibratory gyroscope. The pair of units are arranged perpendicular to the optical axis of the camera with their shake detection sensitivity axes oriented mutually perpendicular to each other. The signal amplifier 2 may be manufactured through bipolar process. The camera controller 3 may be a single chip microcomputer manufactured through a CMOS (complementary-metal-oxide semiconductor) process, and includes an AD (analog-to-digital) converter 4 for sampling the output voltage of the signal amplifier 2, a shake detection control unit 5 which compares the shake value obtained by the AD converter 4 with a predetermined value to perform any form of image stabilization control based on the comparison result, and a DA (digital-to-analog) converter 6 which generates an analog voltage in response to the output of the shake detection control unit 5 to send the analog voltage to the signal amplifier 2. In addition to a shake detection control, the camera controller 3 performs predetermined operations of the camera, such as an autofocus operation for finding a range to an object and driving part of an imaging optical system to a focus position based on the range found, and film takeup and rewinding operations.

The operation of the shake detector device of FIG. 1 is now briefly discussed. When the camera is shaken, the shake detector 1 generates a voltage output in accordance with the magnitude of camera shake. The signal amplifier 2 amplifies this voltage with a gain determined by an externally attached resistor. With no shake taking place, the output voltage of the shake detector 1 (namely, the output voltage with zero angular velocity) is not constant, suffering an offset, and a high gain is set in the signal amplifier 2 to achieve a high shake detection resolution. For this reason, the output of the signal amplifier 2 may exceed a permissible range, and may be saturated on the upper limit of a supply voltage VCC side or lower limit of ground (GND) level. With the output saturated, no correct shake detection operation nor image stabilization operation can be taken subsequently.

In this device, the AD converter 4 samples the output of the signal amplifier 2. Based on the sampled signal, the shake detection control unit 5 determines whether the output of the signal amplifier 2 is saturated. When it is determined that the output of the signal amplifier 2 is saturated or nearly saturated, an instruction is issued to the DA converter 6 to keep the output of the signal amplifier 2 to within a predetermined range. In response to the instruction, the DA converter 6 modifies the voltage applied to one input of the signal amplifier 2 to an appropriate value which keeps the output of the signal amplifier 2 from saturation.

By performing such a feedback control continuously during camera shake detection, the camera acquires the detailed information about camera shake in a wide range.

Figure 2:
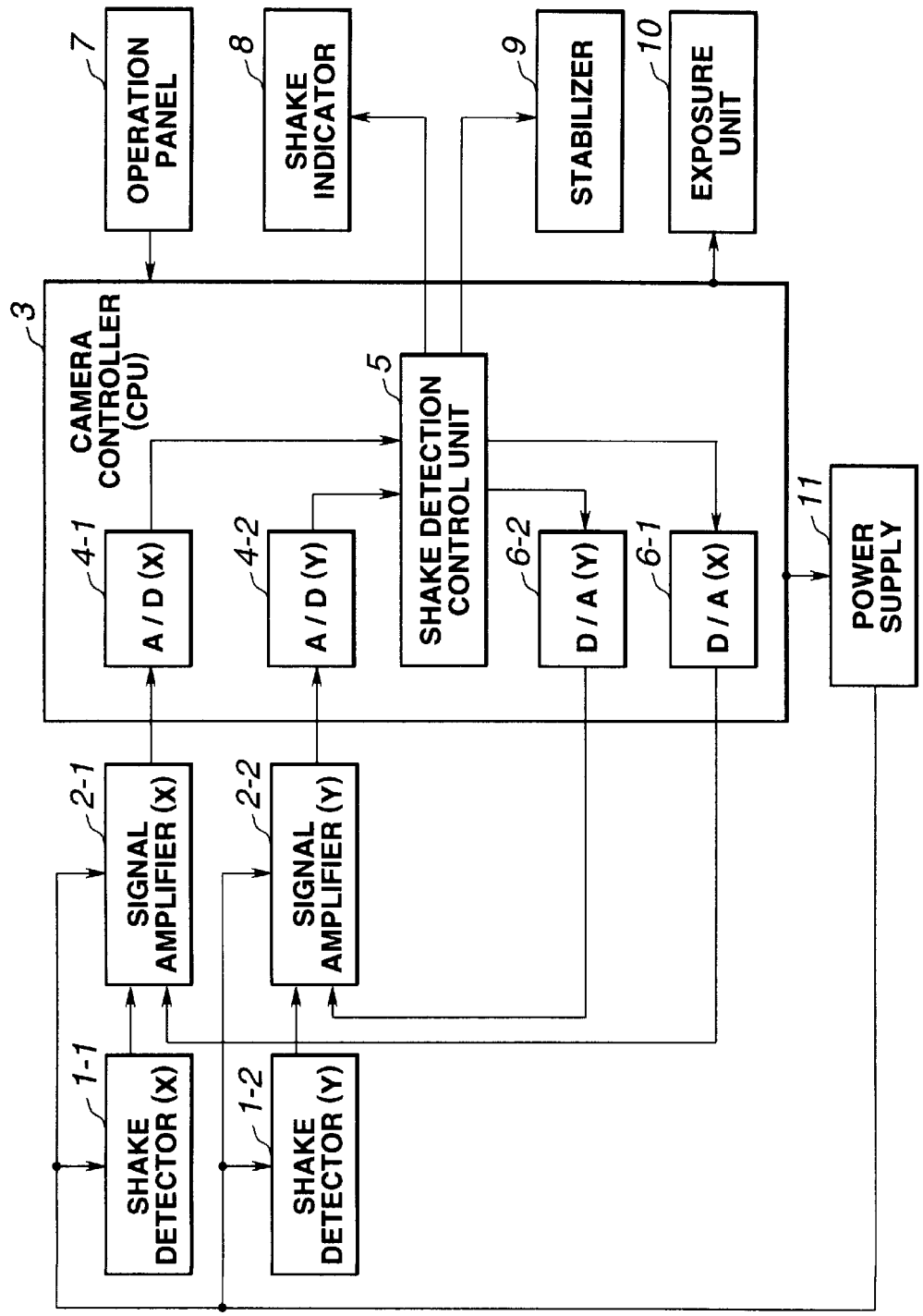
FIG. 2 is a block diagram of a portion for performing the shake detection function in the camera of the present invention.
Figure 3:
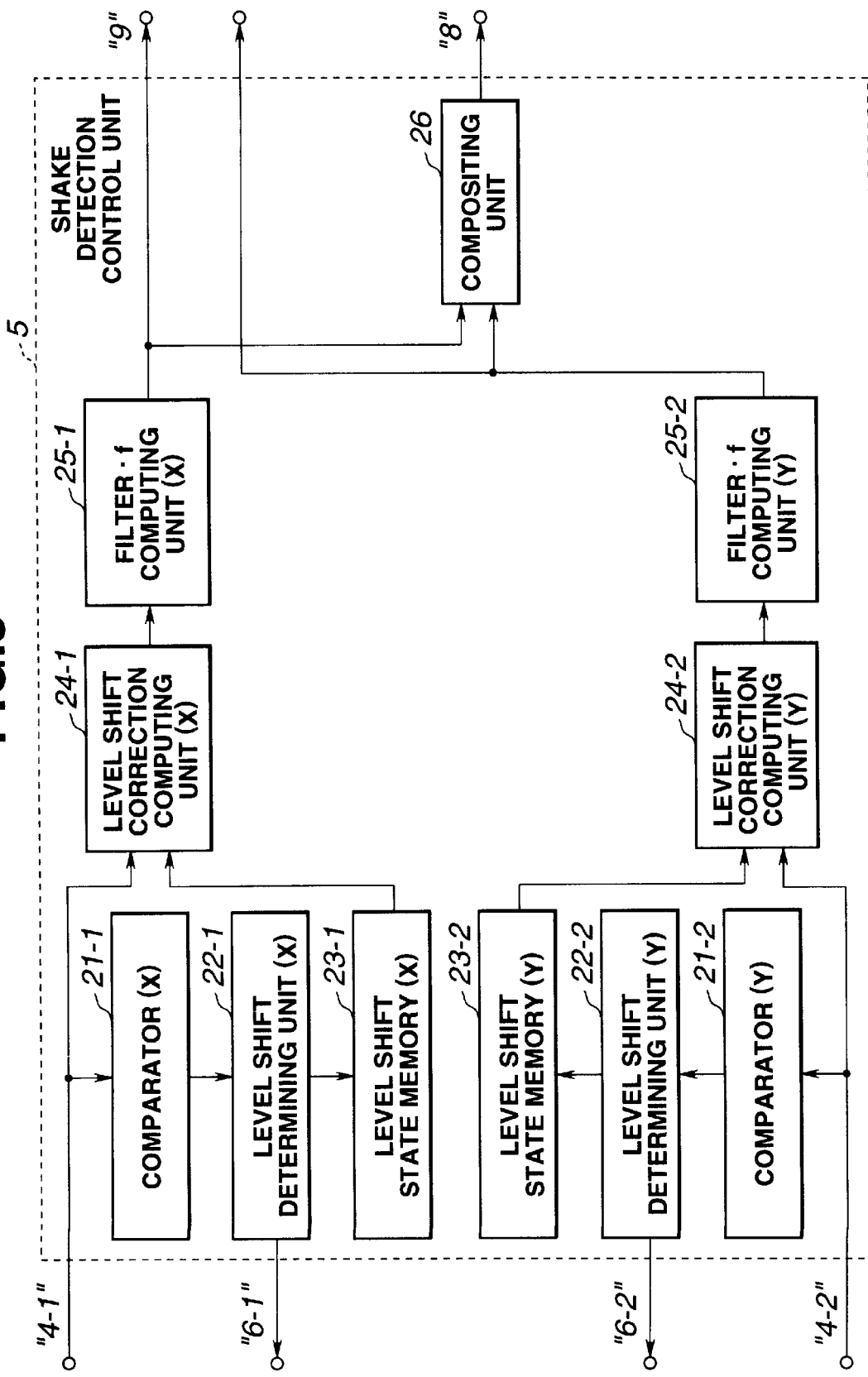
FIG. 3 is a block diagram showing shake detection control unit in the camera of the present invention.

Referring to FIGS. 2 and 3, the specific construction of the shake detector device is now discussed. The following discussion focuses on the shake detection function of the present invention, and other camera functions such as the autofocus operation, film advancing operation and other operations will not be described here.

FIG. 2 is a block diagram showing a portion performing the shake detection function of the camera according to the embodiment of the present invention. In the following discussion, any mechanism handling the yaw shake (in a yaw direction) of the camera is suffixed by the letter X, and any mechanism handling the pitch shake (in a pitch direction) of the camera is suffixed by the letter Y. In FIG. 2, components identical to those described with reference to FIG. 1 are designated with the same reference numerals.

Referring to FIG. 2, the shake detector 1 comprises a shake detector unit (X) 1-1 for detecting the yaw shake of the camera and a shake detector unit (Y) 1-2 for detecting the pitch shake of the camera. The signal amplifier 2 comprises a signal amplifier unit (X) 2-1 and a signal amplifier unit (Y) 2-2, the AD converter 4 comprises an AD converter unit (X) 4-1 and an AD converter unit (Y) 4-2, and the DA converter 6 comprises a DA converter unit (X) 6-1 and a DA converter unit (Y) 6-2.

Connected to the camera controller 3 are an operation panel 7 (operation means), a shake indicator 8 (shake indicator means), an image stabilizer 9 (stabilizer means), an exposure unit 10 (exposure means), and a power supply unit 11 (power supply means). The operation panel 7 is used to input instructions for preparing the camera for photographing and for starting photographing. In this device, the operation panel 7 is also used to start and stop the shake detection/image stabilization of the camera. The operation of the operation panel 7 may be interlocked with a half-pressed position of a two-step release switch with half-pressed and full-pressed positions.

The shake indicator 8 indicates the current shaken state of the camera, and is an LED or sound-generating member. The stabilizer 9 is the means for stabilizing the camera under the camera shake, and includes a driving unit for decentering part of the imaging optical system of the camera and a driving unit for shifting an imaging plane. The exposure unit 10 actually exposes a film to an image light. In a single-lens reflex camera, the exposure unit 10 includes a shutter, a mirror and a diaphragm drive mechanism. In a lens-shutter camera, the exposure unit 10 includes a shutter driving plunger. The power supply unit 11 feeds power to the shake detector units (X) 1-1 and (Y) 1-2 and the like, and starts power feeding at the start of the shake detection/image stabilization operation and stops power feeding at the stop of the shake detection/image stabilization operation, in response to signals from the camera controller 3.

Referring to FIG. 2, the operation of the device is now discussed. The device includes a plurality of means respectively handling the yaw shake in the direction (X) and the pitch shake in the direction (Y). Since these means perform the same function in principle regardless of the shake direction, only the portion relating to the yaw shake in the direction (X) is discussed, and the discussion of the portion relating to the pitch shake in the direction (Y) is omitted.

When an instruction to start the shake detection/image stabilization operation is issued by the operation panel 7, the camera controller 3 operates the power supply unit 11 to start power feeding to the shake detector unit (X) 1-1 for shake detection. The camera controller 3 performs the above-described feedback control so that the output of the signal amplifier unit (X) 2-1 is sampled within a predetermined range. The voltage applied to one input of the signal amplifier unit (X) 2-1 is thus modified to an appropriate value. The AD converter (X) 4-1 samples the output of the signal amplifier unit (X) 2-1. The above operation is repeated until the operation panel 7 issues an instruction to stop the shake detection/image stabilization operation.

Receiving the output of the AD converter unit (X) 4-1, the shake detection control unit 5 presents the magnitude of detected camera shake and gives a warning on the shake indicator 8 while performing the stabilization operation by driving the image stabilizer 9. The camera controller 3 performs an exposure operation by driving the exposure unit 10 when the unshown release button is operated. When the operation panel 7 gives the instruction to stop the shake detection/image stabilization operation, the camera controller 3 stops power feeding to the shake detector unit (X) 1-1.

FIG. 3 is a functional block diagram showing the shake detection control unit 5 in detail. The portion handling the yaw (X) direction shake is discussed, and the discussion of the portion handling the pitch (Y) direction is omitted.

Referring to FIG. 3, a comparator unit (X) 21-1 (comparator means) compares the data sampled by the AD converter (X) 4-1 with a predetermined value to determine whether the output of the signal amplifier unit (X) 2-1 is saturated or nearly saturated. The output of the comparator unit (X) 21-1 is input to a level shift determining unit (X) 22-1 (level shift determining means). The level shift determining unit (X) 22-1 determines whether the output of the signal amplifier unit (X) 2-1 needs level shifting to prevent signal saturation. When the level shift determining unit (X) 22-1 determines that a level shifting is required, the level shift determining unit (X) 22-1 sends information including data about a level shift direction to the DA converter unit (X) 6-1. Upon receiving the information, the DA converter unit (X) 6-1 modifies the voltage applied to one input of the signal amplifier unit (X) 2-1.

A level shift state memory (X) 23-1 (level shift state memory means) stores the output of the level shift determining unit (X) 22-1 as a level shift state value regardless of whether the level shift state is modified or not. This is because the level shift state value needs to be considered in a subsequent level shift correction computation.

A level shift correction computing unit (X) 24-1 (level shift correction computing means) works as a computing module for a shaken state value, and computes a current shaken state value based on a current value sampled by the AD converter unit (X) 4-1 and the level shift state value stored in the level shift state memory (X) 23-1. The current shaken state value BBLURX is basically computed by the following equation, based on a current sampled value ADX, the level shift state value BDAX, an initial sampled value ADX(F) of the AD converter unit (X) 4-1 which is not level-shifted, a voltage variation ΔV per bit in the DA converter unit (X) 6-1, and a gain (G) of the signal amplifier unit (X) 2-1.

$$BBLURX = ADX - ADX(F) \pm BDAX \times \Delta V \times G \tag{1}$$

The level shift state value BDAX is prefixed with the ±sign, because the level shift state value BDAX is determined by the difference between the number of level shift operations performed to prevent saturation on the VCC side and the number of level shift operations performed to prevent saturation on the GND side.

A filter computing and focal-length conversion unit (X) 25-1 (filter computing and focal-length conversion means) performs an LPF (low-pass filter) operation for filtering out high-frequency components and a HPF (high-pass filter) operation for filtering out DC components, in response to the output of the level shift correction computing unit (X) 24-1. These filtering operations are equivalently performed in software. To permit the stabilization operation under the camera shake in accordance with the focal length of the imaging optical system of the camera, a focal distance conversion computation is performed to convert the current shake value into an image blur on the image plane using the current focal length measured by an unshown focal length sensor.

The output of the filter computing and focal-length conversion unit (X) 25-1 is fed to both the image stabilizer 9 (see FIG. 2) and a compositing unit 26. The image stabilizer 9 corrects a blur in response to the output signal from the filter computing and focal-length conversion unit (X) 25-1. The compositing unit 26 performs vector composition based on the output signals of the filter computing and focal-length conversion unit (X) 25-1 and filter computing and focal-length conversion unit (Y) 25-2, and generates a signal appropriate for the shake indication in the shake indicator 8 (see FIG. 2). The shake indicator 8 indicates the camera shake (blur) and warning in response to the signal.

Figure 4:
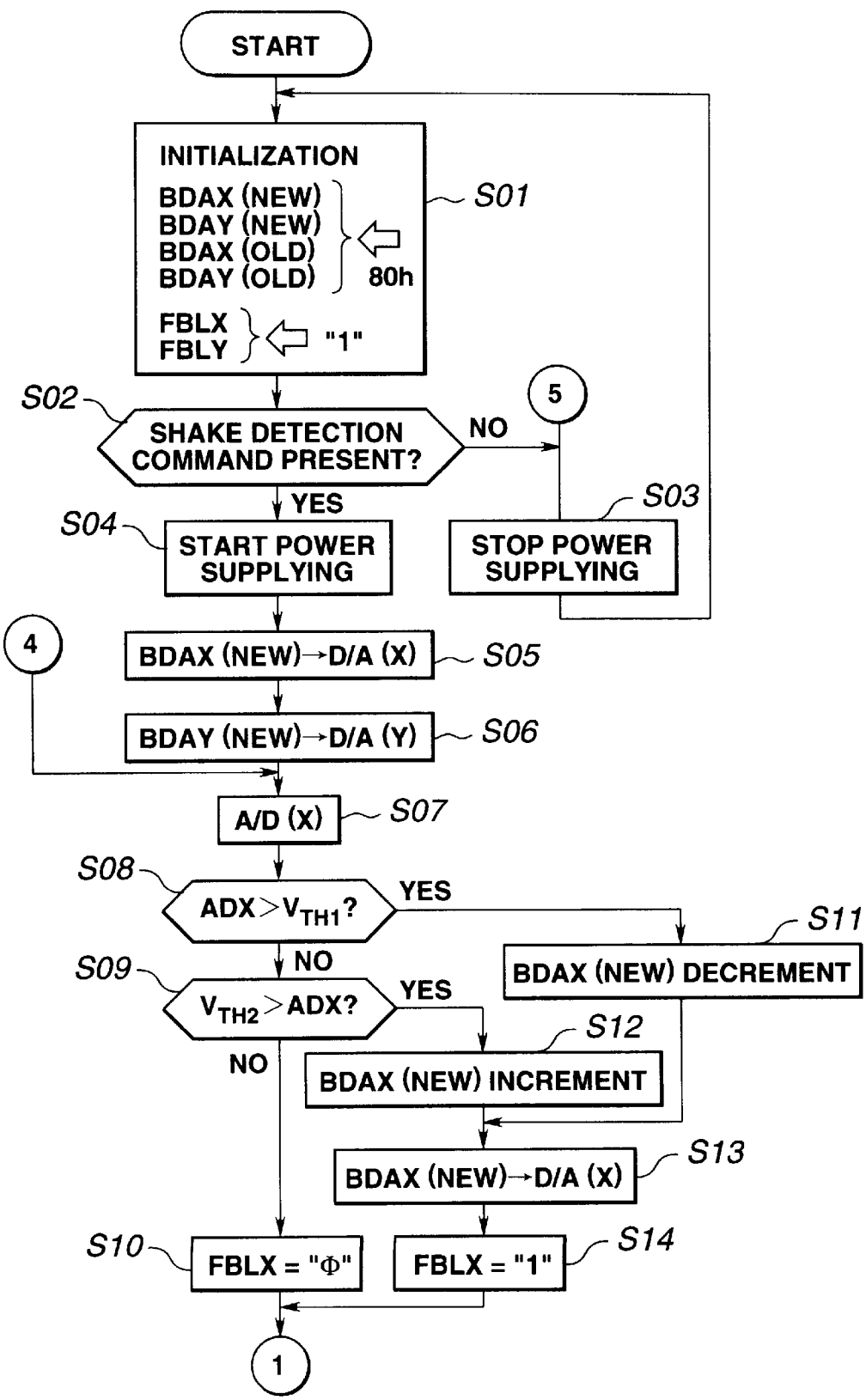
FIG. 4 is a flow diagram showing the operation of the camera.
Figure 5:
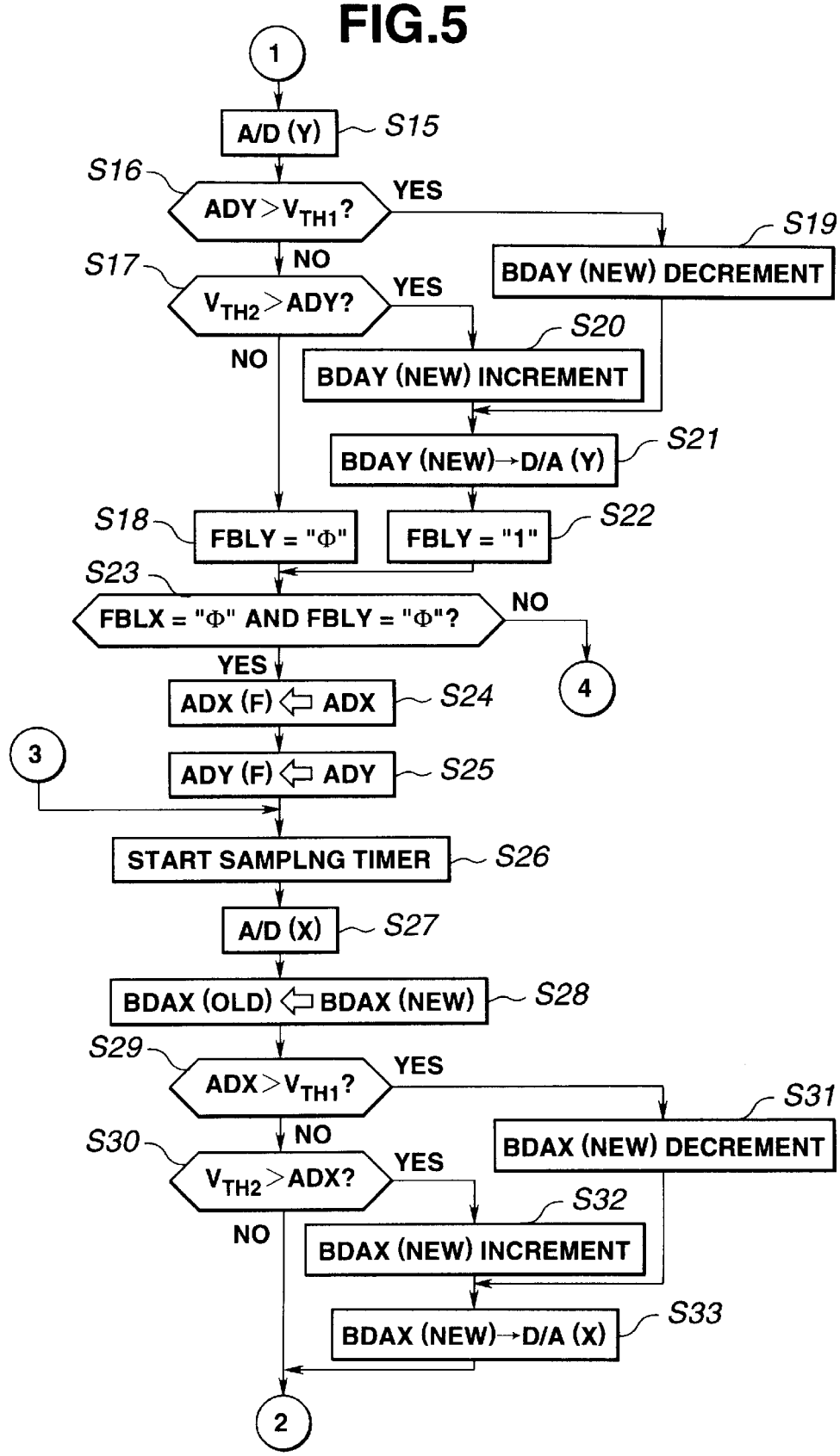
FIG. 5 is a continuation of the flow diagram of FIG. 4.
Figure 6:
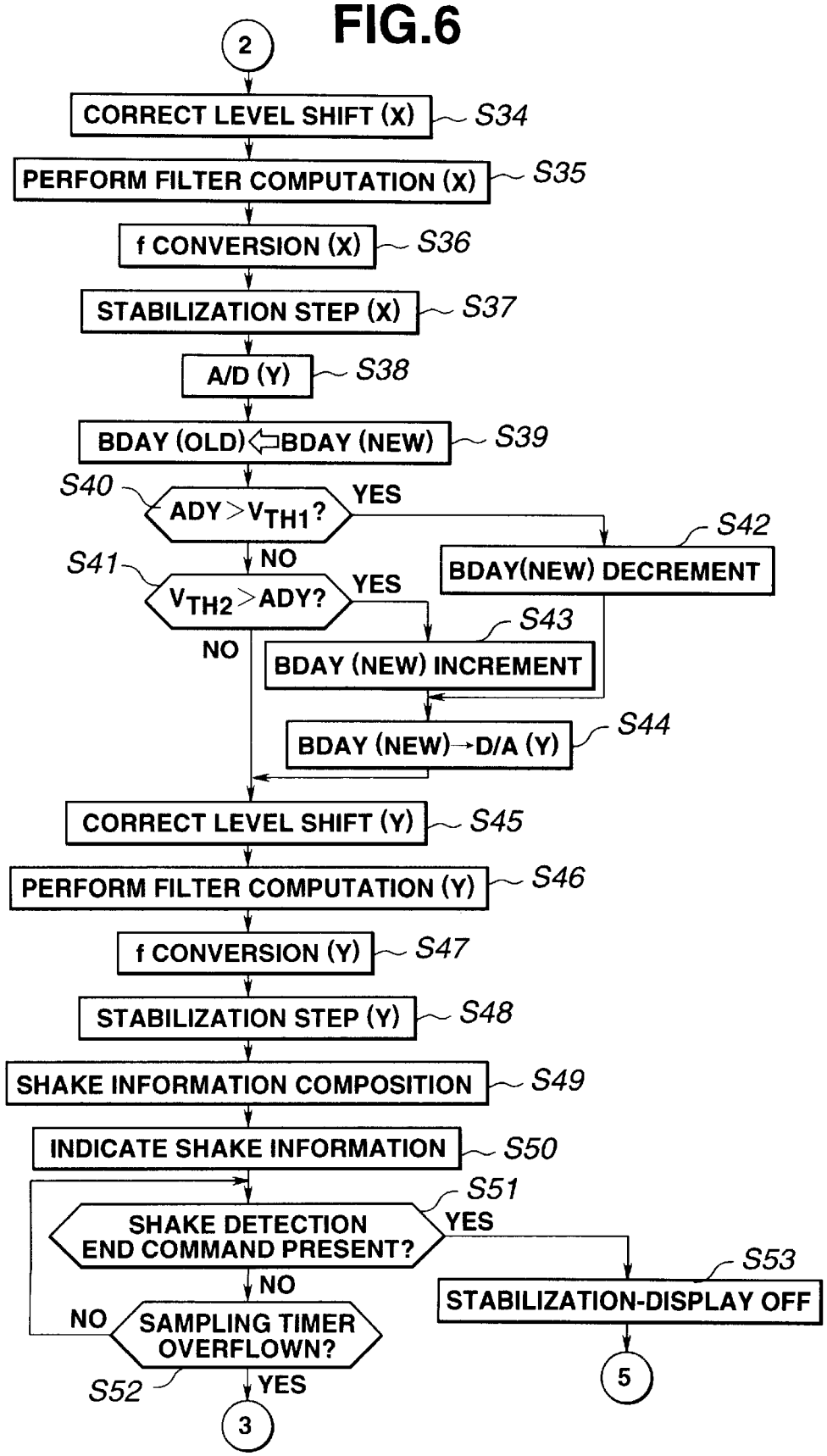
FIG. 6 is a continuation of the flow diagram of FIG. 5.

Referring to FIG. 4 through FIG. 6, the operation of the camera of this embodiment is now discussed. Besides the shake detection control to be described below, the camera controller 3 also performs the autofocus operation, film advancing operation, and the like, but, for simplicity, these operations are not discussed here.

In Step 1 (S1), the camera controller 3 starts the control process, initializing a memory and flags used for the shake detection control. The memory has a memory area for storing the latest level shift state value in the yaw (X) direction (denoted by BDAX(NEW) in FIG. 4), a memory area for storing the level shift state value one cycle earlier (denoted by BDAX(OLD) in FIG. 4), a memory area for storing the latest level shift state value in the pitch (Y) direction (denoted by BDAY(NEW) in FIG. 4), and a memory area for storing the level shift state value one cycle earlier (denoted by BDAY(OLD) in FIG. 4). These initial values, if in 8-bit data, may be 80h (10000000), for example.

There are shown in FIG. 4 a flag FBLX to indicate whether the shake detection system in the yaw (X) direction is initialized and a flag FBLY to indicate whether the shake detection system in the pitch (Y) direction is initialized. In each flag, "1" means that the initialization for the shake detection is not completed, and "0" means that the initialization for the shake detection is completed. In Si, the initial states of the flags are "1".

In S2, the camera controller 3 determines whether the user gives on the operation panel 7 the instruction to start the shake detection/image stabilization. When the camera controller 3 determines that no such instruction is given, the camera controller 3 goes to S3. In S3, the power supply unit 11 stops feeding power to the shake detector units 1-1 and 1-2 and the signal amplifier units 2-1 and 2-2, and the camera controller 3 returns to S1. When the camera controller 3 determines in S2 that the instruction to start the shake detection/image stabilization is issued by the user, the camera controller 3 goes to S4 to cause the power supply unit 11 to feed power to the shake detector units 1-1 and 1-2 and the signal amplifiers 2-1 and 2-2.

In S5, the latest level shift state value in the yaw (X) direction stored in BDAX(NEW) is issued to the DA converter unit (X) 6-1. The DA converter unit (X) 6-1 generates a voltage responsive to BDAX(NEW), and that voltage is fed to one input of the signal amplifier unit (X) 2-1. The signal amplifier unit (X) 2-1 differentially amplifies the output of the shake detector unit (X) 1-1 based on the voltage determined by the DA converter unit (X) 6-1, and the amplified output is fed to the AD converter unit (X) 4-1.

Similarly, in S6, the latest level shift state value in the pitch (Y) direction stored in BDAY(NEW) is issued to the DA converter unit (Y) 6-2. The DA converter unit (Y) 6-2 generates a voltage responsive to BDAY(NEW), and that voltage is fed to one input of the signal amplifier unit (Y) 2-2. The signal amplifier unit (Y) 2-2 differentially amplifies the output of the shake detector unit (X) 1-2 based on the voltage determined by the DA converter unit (Y) 6-2, and the amplified output is fed to the AD converter unit (Y) 4-2.

In S7, the AD converter (X) 4-1 performs AD conversion to sample the output voltage of the signal amplifier unit (X) 2-1. The sampled value then is represented by ADX.

In S8, a determination is made of whether the sampled value ADX is greater than a predetermined value VTH1. When the sampled value ADX is greater than a predetermined value VTH1, the camera controller 3 goes to S11. When the sampled value ADX is not greater than the predetermined value VTH1, the camera controller 3 goes to S9. In S9, a determination is made of whether the sampled value ADX is smaller than a predetermined value VTH2. When the sampled value ADX is smaller than the predetermined value VTH2, the camera controller 3 goes to S12. When the sampled value ADX is not smaller than the predetermined value VTH2, the camera controller 3 goes to S10.

The determinations in S8 and S9 are performed by the comparator unit (X) 21-1 shown in FIG. 3, and the predetermined values are related in magnitude from a high to low voltage order as follows: VCC>VTH1>(½×VCC)>VTH2>GND. The fact that the camera controller 3 goes to S10 through the determinations in S8 and S9 means that the output voltage (sampled value ADX) differentially amplified by the signal amplifier unit (X) 2-1 falls within a range from the predetermined value VTH2 to the predetermined value VTH1. This means that the signal amplifier unit (X) 2-1 amplifies the output voltage of the shake detector unit (X) 1-1 within an appropriate range, specifically neither in a saturated state nor in a nearly saturated state, that the AD converter unit (X) 4-1 performs the AD conversion and that a precise shake detection is carried out.

Since the initialization of the shake detection system in the yaw (X) direction is completed in S10, the flag FBLX is set to "0".

In S11, to which the camera controller 3 goes when it is determined in S8 that the sampled value ADX is greater than the predetermined value VTH1, the latest level shift state value in the yaw (X) direction, BDAX(NEW), is decremented to shift downward the output voltage of the signal amplifier unit (X) 2-1.

In S12, to which the camera controller 3 goes when it is determined in S9 that the sampled value ADX is smaller than the predetermined value VTH2, the latest level shift state value in the yaw (X) direction, BDAX(NEW), is incremented to shift upward the output voltage of the signal amplifier unit (X) 2-1.

In S13, in response to the modification in the level shift state value in S11 or S12, the updated level shift state value BDAX(NEW) is fed to the DA converter unit (X) 6-1. The operations in S11 through S13 are carried out by the level shift determining unit (X) 22-1 shown in FIG. 3. Since the initialization of the shake detection system in the yaw (X) direction is not yet completed in S14, the flag FBLX is set to "1".

S15 through S22 are the same process steps as S7 through S14, respectively, but in the shake detection in the pitch (Y) direction.

Specifically, in S15, the AD converter unit (Y) 4-2 performs the AD conversion to sample the output voltage of the signal amplifier unit (Y) 2-2. The sampled value then is represented by ADY.

In S16, a determination is made of whether the sampled value ADY is greater than the predetermined value VTH1. When the sampled value ADY is greater than a predetermined value VTH1, the camera controller 3 goes to S19. When the sampled value ADY is not greater than the predetermined value VTH1, the camera controller 3 goes to S17. In S17, a determination is made of whether the sampled value ADY is smaller than the predetermined value VTH2. When the sampled value ADY is smaller than the predetermined value VTH2, the camera controller 3 goes to S20. When the sampled value ADY is not smaller than the predetermined value VTH2, the camera controller 3 goes to S18.

The determinations in S16 and S17 are performed by the comparator unit (Y) 21-2 shown in FIG. 3. The fact that the camera controller 3 goes to S18 through the determinations in S16 and S17 means that the output voltage (sampled value ADY) differentially amplified by the signal amplifier unit (Y) 2-2 falls within the range from the predetermined value VTH2 to the predetermined value VTH1. This means that the signal amplifier unit (Y) 2-2 amplifies the output voltage of the shake detector unit (Y) 1-2 within an appropriate range, specifically neither in a saturated state nor in a nearly saturated state, that the AD converter unit (Y) 4-2 performs the AD conversion and that a precise shake detection is carried out.

Since the initialization of the shake detection system in the pitch (Y) direction is completed in S18, the flag FBLY is set to "0".

In S19, to which the camera controller 3 goes when it is determined in S16 that the sampled value ADY is greater than the predetermined value VTH1, the latest level shift state value in the pitch (Y) direction, BDAY(NEW), is decremented to shift downward the output voltage of the signal amplifier unit (Y) 2-2.

In S20, to which the camera controller 3 goes when it is determined in S17 that the sampled value ADY is smaller than the predetermined value VTH2, the latest level shift state value in the pitch (Y) direction, BDAY(NEW), is incremented to shift upward the output voltage of the signal amplifier unit (Y) 2-2.

In S21, in response to the modification in the level shift state value in S19 or S20, the updated level shift state value BDAY(NEW) is fed to the DA converter unit (Y) 6-2. The operations in S19 through S21 are carried out by the level shift determining unit (Y) 22-2 shown in FIG. 3. Since the initialization of the shake detection system in the pitch (Y) direction is not yet completed in S22, the flag FBLX is set to "1".

In S23, a determination is made of whether both the flag FBLX indicating whether the shake detection system in the yaw (X) direction is initialized and the flag FBLY indicating whether the shake detection system in the pitch (Y) direction is initialized are "0". When the two flags are set to "0", the initialization of the two shake detection systems is completed. The camera controller 3 goes to S24. When one of the two flags is set to "1", the initialization of the two shake detection systems is incomplete, and the camera controller 3 returns to S7. The process steps from S7 through S22 are repeated until the two shake detection systems are fully initialized.

In S24 and S25, initial values ADX(F) and ADY(F) are set as the current sampled values (ADX and ADY) to compute the current shaken state value.

The subsequent process steps in S26 thereafter perform normal shake detection and image stabilization operations. In S26, time data is set in a sampling timer for sampling the shake information of the output voltages from the signal amplifier units (X) 2-1 and (Y) 2-2 at regular periods, and the timer is then started.

In S27 through S37, the shake detection and image stabilization operations in the yaw (X) direction are performed. In S27, the AD converter unit (X) 4-1 performs AD conversion to sample the output voltage of the signal amplifier unit (X) 2-1. In S28, BDAX(OLD) is replaced with the latest level shift state value BDAX(NEW). To associate the voltage value sampled in S27 with a level shift state value in the level shift correction computation to be described later, the current level shift state value is temporarily stored. This process step is performed by the level shift state memory (X) 23-1 shown in FIG. 3.

In S29, a determination is made of whether the value ADX sampled in S27 is greater than the predetermined value VTH1. When the sampled value ADX is greater than the predetermined value VTH1, the camera controller 3 goes to S31. When the sampled value ADX is not greater than the predetermined value VTH1, the camera controller 3 goes to S30. In S30, a determination is made of whether the sampled value ADX is smaller than the predetermined value VTH2. When the sampled value ADX is smaller than the predetermined value VTH2, the camera controller 3 goes to S32. When the sampled value ADX is not smaller than the predetermined value VTH2, the camera controller 3 goes to S34.

The fact that the camera controller 3 goes to S34 through the determinations in S29 and S30 means that the output voltage (sampled value ADX) differentially amplified by the signal amplifier unit (X) 2-1 falls within a range from the predetermined value VTH2 to the predetermined value VTH1. This means that the signal amplifier unit (X) 2-1 amplifies the output voltage of the shake detector unit (X) 1-1 within an appropriate range, specifically neither in a saturated state nor in a nearly saturated state, that the AD converter unit (X) 4-1 performs the AD conversion and that a precise shake detection is carried out. In such a case, the voltage generated by the DA converter unit (X) 6-1 is not varied.

In S31, to which the camera controller 3 goes when it is determined in S29 that the sampled value ADX is greater than the predetermined value VTH1, the latest level shift state value in the yaw (X) direction, BDAX(NEW), is decremented to shift downward the output voltage of the signal amplifier unit (X) 2-1.

In S32, to which the camera controller 3 goes when it is determined in S30 that the sampled value ADX is smaller than the predetermined value VTH2, the latest level shift state value BDAX(NEW) is incremented to shift upward the output voltage of the signal amplifier unit (X) 2-1.

In S33, in response to the modification in the level shift state value in S31 or S32, the updated level shift state value BDAX(NEW) is fed to the DA converter unit (X) 6-1. In S34, the level shift correction computing unit (X) 24-1 shown in FIG. 3 performs the level shift correction computation (X) against the shake detected in the yaw (X) direction according to equation (1). The output of the signal amplifier unit (X) 2-1 is shown in FIG. 2 and is used as the current sampled value, and the value stored in the level shift state memory (X) 23-1 is used as the level shift state value one cycle earlier.

In S35, a filtering computation (X) is performed, and in S36, the focal-length conversion (X) is performed by the filter computing and focal-length conversion unit (X) 25-1. In response to the detected shake value, the image stabilizer 9 shown in FIG. 2 performs the image stabilization operation (X) in the yaw (X) shake in S37. This step may be optionally skipped when only the presentation of the camera shake/warning performed by the shake indicator 8 is selected.

S38 through S48 are process steps for the shake detection and image stabilization operations in the pitch (Y) direction. In S38, the AD converter unit (Y) 4-2 performs the AD conversion to sample the output voltage of the signal amplifier unit (Y) 2-2. In S39, BDAX(OLD) is replaced with the latest level shift state value BDAX(NEW). To associate the voltage value sampled in S38 with a level shift state value in the level shift correction computation to be described later, the current level shift state value is temporarily stored. This process step is performed by the level shift state memory (Y) 23-2 shown in FIG. 3.

In S40, a determination is made of whether the value ADY sampled in S38 is greater than the predetermined value VTH1. When the sampled value ADY is greater than a predetermined value VTH1, the camera controller 3 goes to S42. When the sampled value ADY is not greater than the predetermined value VTH1, the camera controller 3 goes to S41. In S41, a determination is made of whether the sampled value ADY is smaller than the predetermined value VTH2. When the sampled value ADY is smaller than the predetermined value VTH2, the camera controller 3 goes to S43. When the sampled value ADY is not smaller than the predetermined value VTH2, the camera controller 3 goes to S45.

The fact that the camera controller 3 goes to S45 through the determinations in S40 and S41 means that the output voltage (sampled value ADY) differentially amplified by the signal amplifier unit (Y) 2-2 falls within the range from the predetermined value VTH2 to the predetermined value VTH1. This means that the signal amplifier unit (Y) 2-2 amplifies the output voltage of the shake detector unit (Y) 1-2 within an appropriate range, specifically neither in a saturated state nor in a nearly saturated state, that the AD converter unit (Y) 4-2 performs the AD conversion and that a precise shake detection is carried out. In such a case, the voltage generated by the DA converter unit (Y) 6-2 is not varied.

In S42, to which the camera controller 3 goes when it is determined in S40 that the sampled value ADY is greater than the predetermined value VTH1, the latest level shift state value in the pitch (Y) direction, BDAY(NEW), is decremented to shift downward the output voltage of the signal amplifier unit (Y) 2-2.

In S43, to which the camera controller 3 goes when it is determined in S41 that the sampled value ADY is smaller than the predetermined value VTH2, the latest level shift state value in the pitch (Y) direction, BDAY(NEW), is incremented to shift upward the output voltage of the signal amplifier unit (Y) 2-2.

In S44, in response to the modification in the level shift state value in S42 or S43, the updated level shift state value BDAY(NEW) is fed to the DA converter unit (Y) 6-2. In S45, the level shift correction computing unit (Y) 24-2 shown in FIG. 3 performs the level shift correction computation (Y) against the shake detected in the yaw (X) direction according to equation (1). The output of the signal amplifier unit (Y) 2-2 is shown in FIG. 2 is used as the current sampled value, and the value stored in the level shift state memory (Y) 23-2 is used as the level shift state value one cycle earlier.

In S46, a filtering computation (Y) is performed, and in S36, the focal-length conversion (Y) is performed by the filter computing and focal-length conversion unit (Y) 25-2. In response to the detected shake value, the image stabilizer 9 shown in FIG. 2 performs the image stabilization operation (Y) in the yaw (Y) shake in S48. This step may be optionally skipped when only the presentation of the camera shake/warning performed by the shake indicator 8 is selected.

S49 and S50 are process steps for the camera shake presentation/warning. In S49, the compositing unit 26 performs vector composition based on the output signals of the filter computing and focal-length conversion unit (X) 25-1 and filter computing and focal-length conversion unit (Y) 25-2, and generates a signal appropriate for the shake indication in the shake indicator 8. The shake indicator 8 indicates the camera shake (blur) and warning in response to the signal. These steps may be optionally skipped if the image stabilization operations performed in S37 and S48 make it unnecessary for the camera to provide the camera shake indication/warning in response to the current shake level.

In S51, a determination is made of whether the user gave the instruction to stop the shake detection/image stabilization operations via the operation panel 7. When there is no instruction given, the camera controller 3 goes to S52. When the instruction is given, the camera controller 3 goes to S53. Optionally, the stop instruction may be automatically issued when an exposure operation with the image stabilization operation enabled is completed or when the voltage of the battery of the camera drops and becomes too low to continue photographing.

In S52, a determination is made of whether the sampling timer that started in S26 has timed out or not. When it is determined that the timer has timed out, the camera controller 3 returns to S26. When it is determined that the timer has not yet timed out, the camera controller 3 returns to S51. In S53, the shake indicator 8 and the image stabilizer 9, if operative, are stopped. When the image stabilizer 9 has been operative, it is reset to its initial position. The camera controller 3 returns to S3, and the power supply unit 11 stops power feeding to the shake detector units 1-1 and 1-2 and signal amplifier units 2-1 and 2-2.

The device of this embodiment may be modified as follows. In the above flow diagram, the sampling timer for performing the shake detection at a regular period is started in S26. After the shake detection/image stabilization operations are executed in the yaw (X) direction and pitch (Y) direction, a determination is made of whether the sampling timer has timed out. Alternatively, the sampling timers are started separately for the processes in the yaw (X) direction and in the pitch (Y) direction, and the sampling timers are later separately checked for time out.

In the above flow chart, the shake detection and image stabilization operations are executed in the order of the yaw (X) direction and the pitch (Y) direction. Alternatively, the yaw (X) direction process and the pitch (Y) direction process may be performed in parallel rather than sequentially. In such a case, the AD conversion in the yaw (X) direction in S27 may be followed by the AD conversion in the pitch (Y) direction in S38, and the level shift correction computation (X) in the yaw (X) direction in S34 may be followed by the level shift correction computation (Y) in the pitch (Y) direction in S45.

Figure 7A:
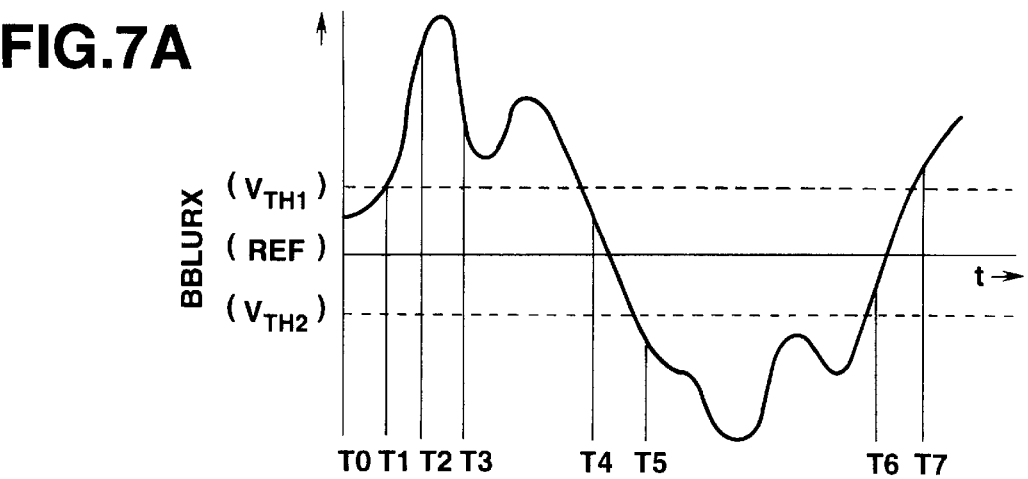
FIG. 7A shows a locus of the shaken state BLURX of the camera.
Figure 7B:
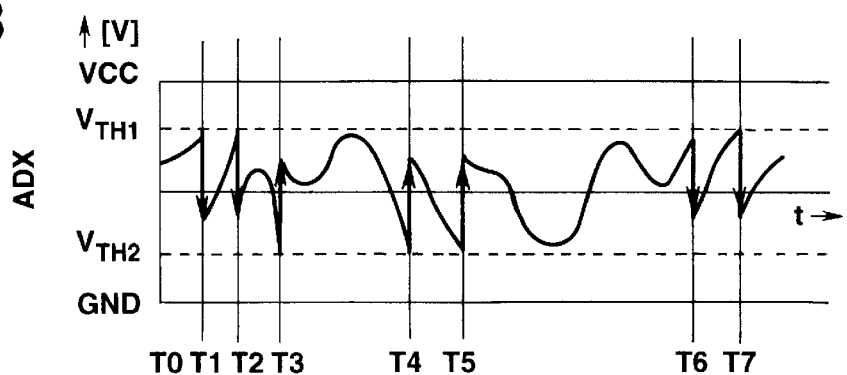
FIG. 7B shows a locus of the sampled value ADX of the camera.
Figure 7C:
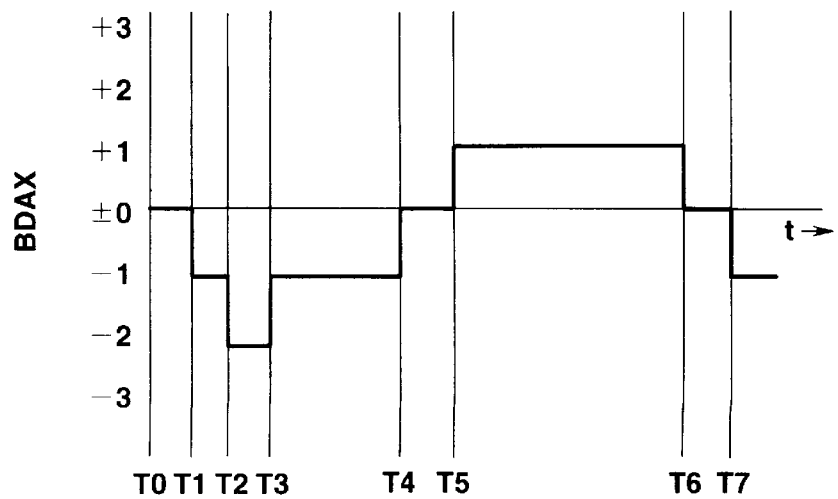
FIG. 7C shows a locus of the level shift state value BDAX of the camera.

Referring to FIGS. 7A–7C, the level shift operation of the device of the present invention is discussed. Only the level shift operation in the yaw (X) direction is discussed here, and the level shift operation in the pitch (Y) direction is omitted because it is identical to that in the yaw (X) direction.

FIG. 7A shows a locus of the shaken state BBLURX of the camera. The shake signal detected by the shake detector unit (X) 1-1 is amplified by the signal amplifier unit (X) 2-1, and the level shift component of the shake signal amplified is corrected using the level shift state value BDAX. The abscissa represents time, and the ordinate represents the shake speed. FIG. 7B shows a locus of the current sampled value ADX of the AD converter unit (X) 4-1. The sampled value ADX is obtained by controlling the output differentially amplified by the signal amplifier unit (X) 2-1 to within the range from the predetermined value VTH2 to the predetermined value VTH1. The abscissa represents voltage corresponding to the shake speed. FIG. 7C shows a locus of the level shift state value BDAX.

As can be seen from FIGS. 7A–7C, the shake speed remains within the range from the predetermined value VTH2 to the predetermined value VTH1 for a duration from T0 to T1 in FIGS. 7A and 7B. The value BDAX remains ±0 in FIG. 7C. At time T1, ADX rises above the predetermined value VTH1 in the locus in FIG. 7B, and is expected to be saturated on the VCC side. It is determined that ADX>VTH1 (S8 in FIG. 4), and the output voltage of the DA converter unit (X) 6-1 is modified, namely, is level shifted. Referring to FIG. 7C, the level shifting is performed by lowering the level shift state value BDAX, which determines the output voltage of the DA converter unit (X) 6, by 1. The variation in voltage level is equal to the multiplication of the voltage variation ΔV per bit of the DA converter unit (X) 6-1 by the gain G of the signal amplifier unit (X) 2-1.

Since ADX is above the predetermined value VTH1 in the locus in FIG. 7B at time T2, the output voltage of the DA converter unit (X) 6-1 is again modified to lower the level shift state value BDAX by 1 in the same manner as at time T1. BDAX is −2 at this point.

At time T3, ADX drops below the predetermined value VTH2 in the locus shown in FIG. 7B, and there is a possibility that ADX is saturated on the GND side. It is now determined that VTH2>ADX (S9 in FIG. 4), and the output voltage of the DA converter unit (X) 6-1 is modified, namely, is level-shifted. Referring to FIG. 7C, the level shifting is performed by raising the level shift state value BDAX, which determines the output voltage of the DA converter unit (X) 6-1, by 1. The value of BDAX is −1 as in the duration from time T1 to time T2.

Similarly, the level shifting operation of the output of the signal amplifier unit (X) 2-1 is continuously performed. The level shift operation range is widened as long as it is within the voltage generation range of the DA converter unit (X) 6-1. For example, when the number of bits of the DA converter unit (X) 6-1 is 8, a 256-level shifting operation is possible.

In the device of the present invention, the camera shake signal is amplified by the signal amplifier unit while the camera controller (CPU) controls the signal amplifier unit by supplying a voltage signal to the signal amplifier unit to keep the amplified shake signal to within the predetermined range. No dedicated module for such control nor control lines connected thereto are required. This arrangement permits a relatively simplified construction of the device. Fast control of the camera is achieved because communication for such a dedicated module is not required either. The need for an expensive CPU is also eliminated. The shake signal is amplified and the amplified signal is level shifted. The present invention thus provides a simple-construction camera having a miniature and precise shake detector which is capable of acquiring the detailed information about camera shake in a wide range.

What is claimed is:

1. A camera with a shake detection function, comprising:
    shake detector means for detecting a shaken state of said camera;
    signal amplifier means for amplifying an output of said shake detector means;
    control means which samples an output of said signal amplifier means while outputting a predetermined voltage to said signal amplifier means in accordance with the sample result,
    wherein said control means comprises:
        memory means for storing a level shift state as a level shift state value; and
        computing means for correcting the output of said signal amplifier means in a subsequent sampling, using the level shift state value stored in said memory means.

2. A camera with a shake detection function according to claim 1, wherein said control means outputs a predetermined voltage to said signal amplifier means so that the output of said signal amplifier means is kept to within an appropriate range.

3. A camera with a shake detection function according to claim 1, wherein said control means outputs a predetermined voltage to said signal amplifier means so that the output of said signal amplifier means is not saturated.

4. A camera with a shake detection function according to claim 1, wherein said control means is a single-chip microcomputer.

5. A camera with a shake detection function according to claim 1, wherein said signal amplifier means performs a differential amplification based on an output of said shake detector means and the predetermined voltage of said control means.

6. A camera with a shake detection function according to claim 1, further comprising shake indicator means for indicating the shaken state of said camera in accordance with an output of said control means.

7. A camera with a shake detection function according to claim 1, further comprising:
    operation means for inputting instructions to start and stop a shake detection operation; and
    power supply means for feeding power to said shake detector means and said signal amplifier means in response to instructions from said operation means.

8. A camera with a shake detection function according to claim 1, wherein:
    said control means includes means for setting upper and lower threshold limits and means for adjusting a feedback signal to said signal amplifier means to assure that the output of the signal amplifier means is maintained within a range of said threshold limits, and storing the feedback signal and memory for calculating a shake detection signal and a shake correction signal by a level shifting unit and a filtering unit.

9. A camera with a shake detection function according to claim 1, wherein:
    said signal amplifier means level shifts as amplified voltage based on an output from the controller.

10. A camera with a shake detection function, comprising;
    shake detector means for detecting a shaken state of said camera;
    signal amplifier means for amplifying an output of said shake detector means;
    unitary-structured control means which samples an output of said signal amplifier means while outputting a predetermined voltage to said signal amplifier means for level shifting in accordance with the sample result to keep an output of said signal amplifier means within an appropriate range,
    wherein said control mean comprises:
        memory means for storing a level shift state as a level shift state value; and
        computing means for correcting the output of said signal amplifier means in a subsequent sampling using the level shift state value stored in said memory means.

11. A camera with a shake detection function, comprising:
    shake detector means for detecting a shaken state of said camera;
    signal amplifier means for amplifying an output of said shake detector means; and
    control means for controlling an output of said signal amplifier means to within an appropriate range;
    wherein said control means comprises;
        an analog-to-digital converter for sampling the output of said signal amplifier means;
        comparator means for comparing a value output by said analog-to-digital converter with a predetermined value;
        a digital-to-analog converter for outputting an analog voltage to said signal amplifier means for level shifting of said signal amplifier means in accordance with the comparison result provided by said comparator means;

memory means for storing a level shift state as a level shift state value; and computing means for correcting a latest output of said signal amplifier means, using the level shift state value stored in said memory means.

12. A camera with a shake detection function according to claim 11, wherein a sampling period of said analog-to-digital converter is approximately equal to an update period of said digital-to-analog converter.

13. A camera with a shake detection function according to claim 11, wherein said shake detector means is a vibratory gyroscope.

14. A camera with a shake detection function according to claim 11, wherein said control means is a single-chip microcomputer.

15. A camera with a shake detection function according to claim 11, wherein said control means is single-chip complementary-metal-oxide semiconductor integrated circuit.

16. A camera with a shake detection function according to claim 11, wherein said control means is a complementary-metal-oxide semiconductor device and said signal amplifier means is a bipolar device.

17. A camera with a shake detection function, comprising:

shake detector means for detecting a shaken state of said camera;

signal amplifier means for amplifying an output of said shake detector means; and control means which controls operations of said camera while periodically sampling an output of said signal amplifier means to output a predetermined voltage to said signal amplifier means for level shifting the output of said signal amplifier means in response to the sample result, wherein said control means comprises memory means for storing the level shift state as a value to output an actual shake signal from the output of said signal amplifier means after the level shifting.

18. A camera with a shake detection function according to claim 17, wherein said operations of said camera include at least one of an autofocus operation, a film advancing operation, and an exposure operation.

19. A camera with a shake detection function, comprising:

shake detector means for detecting a shaken state of said camera;

signal amplifier means for amplifying an output of said shake detector means; and control means for controlling predetermined operations of said camera, wherein said control means comprises:

a digital-to-analog converter for outputting a predetermined analog voltage said signal amplifier means for level shifting to keep an output of said signal amplifier means within an appropriate range; and computing means for correcting the level shifted output of said signal amplifier means while storing the level shift state, and computing an actual shake signal.

20. A camera with a shake detection function, comprising:

a shake detector circuit for detecting a shaken state of said camera;

a signal amplifier circuit for amplifying an output of said shake detector circuit; and a controller circuit for controlling operations of said camera;

wherein said controller circuit comprises;

an analog-to-digital converter for sampling an output of said signal amplifier circuit;

a comparator circuit for comparing a value output by said analog-to-digital converter with a predetermined value; and a digital-to-analog converter for outputting an analog voltage to said signal amplifier circuit for level shifting in accordance with the comparison result provided by said comparator circuit; and computing means for correcting the level shifted output of said signal amplifier circuit while storing the level shift state, and computing an actual shake signal.

21. A camera with a shake detection function according to claim 20, wherein said controller circuit is a single-chip microcomputer with a digital-to-analog converter function.

* * * * *

UNITED STATES PATENT AND TRADEMARK OFFICE
CERTIFICATE OF CORRECTION

PATENT NO : 6,067,418
DATED : May 23, 2000
INVENTOR(S) : Tatsuya Sato

It is certified that error appears in the above-identified patent and that said Letters Patent are hereby corrected as shown below:

At column 6, line 34, after the letter "s", delete "i" and insert therefor --1--.

Signed and Sealed this

Seventeenth Day of April, 2001

*Attest:*

NICHOLAS P. GODICI

*Attesting Officer*     *Acting Director of the United States Patent and Trademark Office*